(12) United States Patent
Behrens et al.

(10) Patent No.: US 12,447,896 B2
(45) Date of Patent: Oct. 21, 2025

(54) ILLUMINABLE VEHICLE COMPONENT, AND MOTOR VEHICLE HAVING AN ILLUMINABLE VEHICLE COMPONENT

(71) Applicant: Bayerische Motoren Werke Aktiengesellschaft, Munich (DE)

(72) Inventors: Nicolas Behrens, Marzling (DE); Patrick Dumm, Offenstetten (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/273,803

(22) PCT Filed: Feb. 2, 2022

(86) PCT No.: PCT/EP2022/052448
§ 371 (c)(1),
(2) Date: Jul. 24, 2023

(87) PCT Pub. No.: WO2022/199914
PCT Pub. Date: Sep. 29, 2022

(65) Prior Publication Data
US 2024/0300410 A1    Sep. 12, 2024

(30) Foreign Application Priority Data
Mar. 25, 2021    (DE) ...................... 10 2021 107 524.6

(51) Int. Cl.
*B60Q 3/74*    (2017.01)
*B60K 35/60*   (2024.01)
*B60Q 1/00*    (2006.01)

(52) U.S. Cl.
CPC ............... *B60Q 3/74* (2017.02); *B60K 35/60* (2024.01); *B60Q 1/0035* (2013.01); *B60K 2360/334* (2024.01)

(58) Field of Classification Search
CPC ... B60Q 3/74; B60Q 1/0035; B60K 2360/334
See application file for complete search history.

(56) References Cited

U.S. PATENT DOCUMENTS

| 4,929,866 A * | 5/1990 | Murata ................ G02B 6/0036 362/310 |
| 5,642,933 A * | 7/1997 | Hitora ..................... F21S 8/083 362/348 |

(Continued)

FOREIGN PATENT DOCUMENTS

| DE | 10 2013 203 162 A1 | 9/2013 |
| DE | 10 2013 202 957 A1 | 8/2014 |

(Continued)

OTHER PUBLICATIONS

International Search Report (PCT/ISA/210) issued in PCT Application No. PCT/EP2022/052448 dated Sep. 20, 2022 with English translation (6 pages).

(Continued)

*Primary Examiner* — Abdulmajeed Aziz
(74) *Attorney, Agent, or Firm* — Crowell & Moring LLP

(57) ABSTRACT

An illuminable vehicle component includes a visible side and a component surface that is arranged on the visible side and provided with a three-dimensional structure pattern. At least one first light-producing device is arranged in a defined position relative to the component surface such that light emitted thereby illuminates first structure portions and generates a shadow that is cast on second structure portions. At least one second light-producing device is arranged in a defined position relative to the component surface such that light emitted thereby illuminates the second structure portions and generates a shadow that is cast on the first structure portions.

12 Claims, 3 Drawing Sheets

(56) References Cited

U.S. PATENT DOCUMENTS

| | | | | |
|---|---|---|---|---|
| 7,281,833 B2 * | 10/2007 | Akiyama | ............... | F21S 43/14 |
| | | | | 362/348 |
| 9,974,136 B1 * | 5/2018 | Wang | ................... | B60Q 1/1415 |
| 10,697,606 B1 * | 6/2020 | Fredricks | .............. | F21S 41/148 |
| 2007/0217193 A1 | 9/2007 | Lin et al. | | |
| 2013/0235351 A1 | 9/2013 | Sachdev et al. | | |

FOREIGN PATENT DOCUMENTS

| | | |
|---|---|---|
| DE | 10 2016 219 530 A1 | 4/2018 |
| EP | 2 676 841 A1 | 12/2013 |
| WO | WO 00/58066 A1 | 10/2000 |
| WO | WO 01/23804 A1 | 4/2001 |

OTHER PUBLICATIONS

German-language Written Opinion (PCT/ISA/237) issued in PCT Application No. PCT/EP2022/052448 dated Sep. 20, 2023 (6 pages).
German-language Search Report issued in German Application No. 10 2021 107 524.6 dated Aug. 16, 2021 with partial English translation (13 pages).

\* cited by examiner

ILLUMINABLE VEHICLE COMPONENT, AND MOTOR VEHICLE HAVING AN ILLUMINABLE VEHICLE COMPONENT

BACKGROUND AND SUMMARY OF THE INVENTION

The invention relates to an illuminable vehicle component and to a motor vehicle having an illuminable vehicle component.

Currently, besides functional lamps, light effects in the vehicle interior are generated by decorative covers partially illuminated in transmission. Furthermore, interior surfaces are illuminated indirectly and diffusely as ambient illumination.

The illumination of components in transmission entails large installation space requirements and efficiency losses. In the case of projected light effects such as patterns on surfaces, blurring that negatively influences the impression occurs because of vibrations during driving.

Against this background, the object of the invention is to provide an improved way in which light effects can be generated on vehicle components-particularly even during driving.

The object is achieved by the claimed vehicle component and the claimed motor vehicle.

An illuminable vehicle component is proposed, having a visible side and a component surface that is arranged on the visible side and is provided with a three-dimensional structural pattern. At least one first light generating device is provided, which is arranged in a defined position with respect to the component surface in such a way that light radiated by the device illuminates first structural sections and generates shadowing on second structural sections. Furthermore, at least one second light generating device is provided, which is arranged in a defined position with respect to the component surface in such a way that light radiated by the device illuminates the second structural sections and generates shadowing on the first structural sections.

Expressed in other words, the component is illuminated from at least two directions, each illumination independently generating a light/shadow effect on the component. By the light/shadow effect, the three-dimensional structure is visually highlighted and emphasized. For this purpose, the light generating devices are preferably arranged so that some structural sections are turned toward the light and other structural sections are turned away from the light. The illuminations are applied in such a way that the light/shadow effects are superimposed, but individual structural sections of the three-dimensional structural pattern are illuminated only by either the first or the second light generating device, so that versatile optical effects may be achieved. If the first and second light generating devices emit light with different light colors, for example, a three-dimensional structure with a single color may have a two-colored or multicolored effect for the observer. By the structural pattern being arranged fixed on the component surface and not being projected onto the component, no blurring is observed during driving.

The visible side refers to that side of the vehicle component which is visible to the vehicle user when installed. The component surface having the three-dimensional structural pattern may form the entire visible face of the component or only a part of the visible face.

The component surface may be flatly configured or have a three-dimensional surface profile. In addition, the component surface has the three-dimensional structural pattern.

The three-dimensional structural pattern comprises elevations and/or depressions, and may for example be formed by corrugations, angled or round depressions or projections, points, etc. The three-dimensional structural pattern in the component surface is generated by 3D structures, for example elevations and/or depressions, and/or by pitched faces.

In order to achieve a uniform appearance, the three-dimensional structural pattern may preferably be a periodic structural pattern, this being intended to mean a pattern which has a plurality of individual structures and which may be brought into congruence with itself by displacement, rotation, reflection, glide reflection and combinations thereof.

Alternatively, the three-dimensional structural pattern may be a structural pattern that tapers out (fades). A tapering pattern comprises a plurality of individual structures, which are well-defined in one region and become coarser with an increasing separation from this region. By expedient use of tapering structural patterns, it is possible to achieve the effect that the shadowing is still clearly perceptible even at very large distances from the light generating device. For example, the pattern becomes progressively coarser with an increasing separation from the light source. In this way, the number of light generating devices may be minimized while the desired visual structural effect may nevertheless be generated.

The three-dimensional structural pattern preferably differs from a surface grain by the height exhibited by the structural pattern. Preferably, the structural pattern has a maximum height of at least 2 mm or at least 3 mm or at least 5 mm. Furthermore, the maximum height of the structural pattern is preferably 2 cm or less, and in particular 1 cm or less. The maximum height of the structural pattern is defined in this case as the height difference between a neighboring highest point and lowest point of the structural pattern. The height difference is caused by the pattern itself. A height difference due to the three-dimensional shape of the component is not to be taken into account in this case.

Structural sections of the three-dimensional structural pattern are illuminated by the light generating devices. In this case, a structural section is intended to mean a particular face of an individual structure, for example of an elevation, which extends over a certain width and a certain height as far as the highest point of the individual structure. The structural section may, for example, reach from a lowest point of the individual structure as far as a highest point of the individual structure. The structural section may, for example, be bounded by an edge. The structural section may, for example, also be a subregion of a curved face. A plurality of first and second structural sections are respectively illuminated by the light generating devices, that is to say a plurality of individual structures of the structural pattern are illuminated in the respective structural section.

In order to achieve the described light/shadow effect, the first light generating device may preferably be arranged so that light emitted by it strikes an uppermost point of the second structural sections but not a lower or lowermost point of the second structural sections. The second structural sections are turned away from the first light generating device, that is to say their surface normals point away from the light generating device. The lower point may, for example, be located in the lower third of the structural section. Likewise, the second light generating device may preferably be arranged so that light emitted by it strikes an uppermost point of the first structural sections but not a lower point of the first structural sections. The first structural sections are turned away from the second light generating device.

In order to generate particularly clear shadowing and strong light effects, in one configuration it may be advantageous for the first light generating device and the second light generating device to be directed onto mutually opposite sides of the component surface. One light generating device may for example be arranged on the right of the component surface and be directed onto the latter, and the second light generating device may then be arranged on the left of the component surface and be directed onto the latter. The shadow effect may be enhanced even further if the lighting devices are arranged in such a way that the shadow on the respective structural section extends over the entire height of the structural section, that is to say from an uppermost point of the structural section to a lowermost point of the structural section.

Particularly "sharp" light/shadow effects may be generated in a configuration in which the three-dimensional structural pattern comprises a serrated structure with first structural faces having a first pitch angle and second structural faces having a second pitch angle. The first structural faces are respectively turned in one direction and the second structural faces are respectively turned in another direction. In order to generate the light/shadow effect described above, in this configuration a principal angle of incidence of the light emitted by the first light generating device is greater than the second pitch angle and a principal angle of incidence of the light emitted by the second light generating device is greater than the first pitch angle. The principal angle of incidence is the angle between the principal radiation direction of the light generating device and the perpendicular to the component surface at the location of the light incidence. The principal radiation direction is the direction in which the light generating device radiates the maximum brightness, which in the case of a light cone is usually the center of the light cone. The pitch angle is the angle between the structural face and the "structure-free" component surface, the structure-free component surface being determinable for example as a face that is defined by lowest structural points lying next to one another.

According to another configuration, the first light generating device is arranged in such a way that light emitted by it generates shadowing in the lower subregion of the second structural section but illuminates an upper subregion of the second structural section. This may, for example, be the case when the second structural section has a kinked or bent profile that runs more shallowly in an upper subregion than in a lower subsection. An upper subsection refers for example to the uppermost 20%, in particular the uppermost 30% or the uppermost 40% of the subsection. A lower subsection preferably refers to the lowermost 20%, in particular the lowermost 30% or the lowermost 40% of the subsection. The terms "upper" and "lower" are to be understood in this context with reference to the lowest point of the three-dimensional structure (bottom) and the uppermost point of the three-dimensional structure (top).

By only the upper subregion being illuminated in this configuration both by the first light generating device and by the second light generating device, a mixed color and therefore an additional color effect may be represented by superposition of the two light colors, without a further light generating device having to be provided. This configuration therefore offers a particularly economical way of producing prominent color effects.

The light generating device may, for example, be a light source such as an LED or a laser lamp. In addition, a lens or a lens system may be provided in order to shape a defined light cone. In order to limit the angle of emergence of the light radiation, in one configuration it may also be advantageous for a chamber lamp, in which the light source is arranged in a chamber that spatially limits the emergence of light, to be used as the light generating device.

Lighting of even relatively large components may be implemented economically in one configuration by providing two or more first light generating devices on the vehicle component to be illuminated, which devices are adapted to illuminate respectively different first structural sections. The two or more light generating devices may for example—in relation to the component surface—be arranged next to one another or above one another. The two or more light generating devices may preferably be arranged so that neighboring light cones at least strike the component or overlap one another. If the first light generating devices emit light with the same wavelength, particularly uniform illumination is achieved.

Special light effects, for example colored effects with multiple colors, may be achieved in another configuration by the two or more first light generating devices being adapted to emit different light colors to one another. If the first light generating devices are additionally arranged so that neighboring light cones partially overlap one another, variegated light effects may be generated by color superposition.

Besides the choice of the three-dimensional pattern, the effect of the vehicle component may also be influenced by the material selection of the component surface. In order to achieve high-quality optics and haptics, the component surface may preferably be configured as a textile surface, leather surface, wood surface, metal surface or plastic surface, in which case the respective material may additionally have one or more varnish layers, for example colored or clear varnish layers.

A motor vehicle having an illuminable vehicle component as described above is furthermore proposed. The vehicle component is preferably an inner trim component, for example a door trim, or an interior surface of the vehicle, for example a dashboard trim. The vehicle component is preferably installed fixed in the motor vehicle, likewise the light generating devices, so that exact alignment with one another is ensured. In one configuration, the first light generating device and the second light generating device are arranged in a fixed position in the vehicle, for example on a vehicle pillar.

Features and details that are described in connection with the vehicle component also apply in connection with the motor vehicle, and vice versa, so that in respect of the disclosure reference is or may always be made alternately between the individual aspects of the invention.

Further advantages, features and details of the invention may be found in the following description, in which exemplary embodiments of the invention are described in detail with reference to the drawings.

In this case, the features mentioned in the claims and in the description may respectively be essential to the invention independently or in any desired combination. When the term "can" is used in this application, this includes both the technical possibility and the actual technical implementation.

Exemplary embodiments will be described below with the aid of the appended drawings.

DETAILED DESCRIPTION OF THE DRAWINGS

Figure 1:
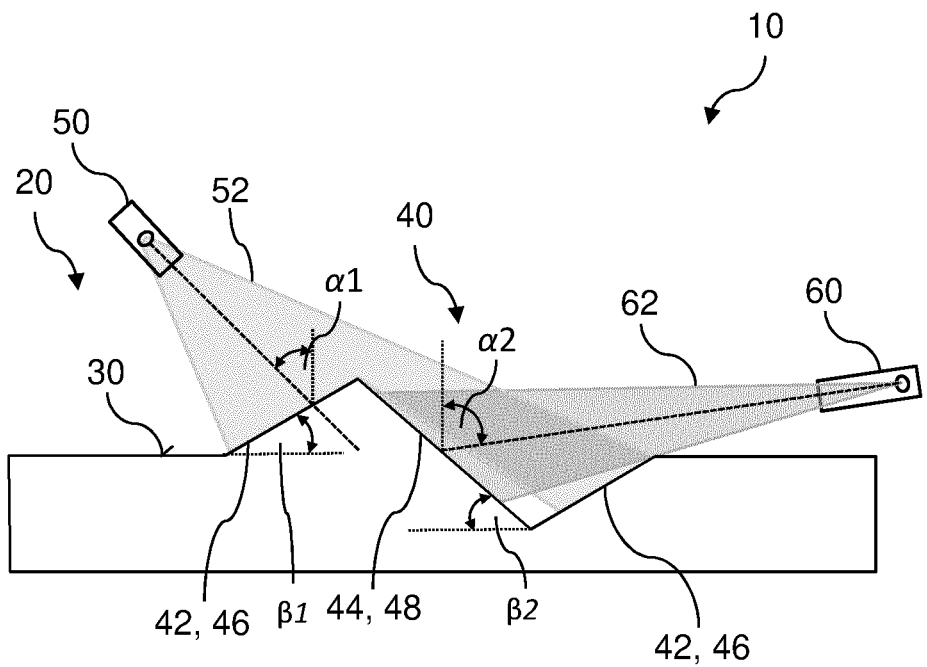
FIG. 1 shows a sectional view of an exemplary vehicle component.
Figure 3:
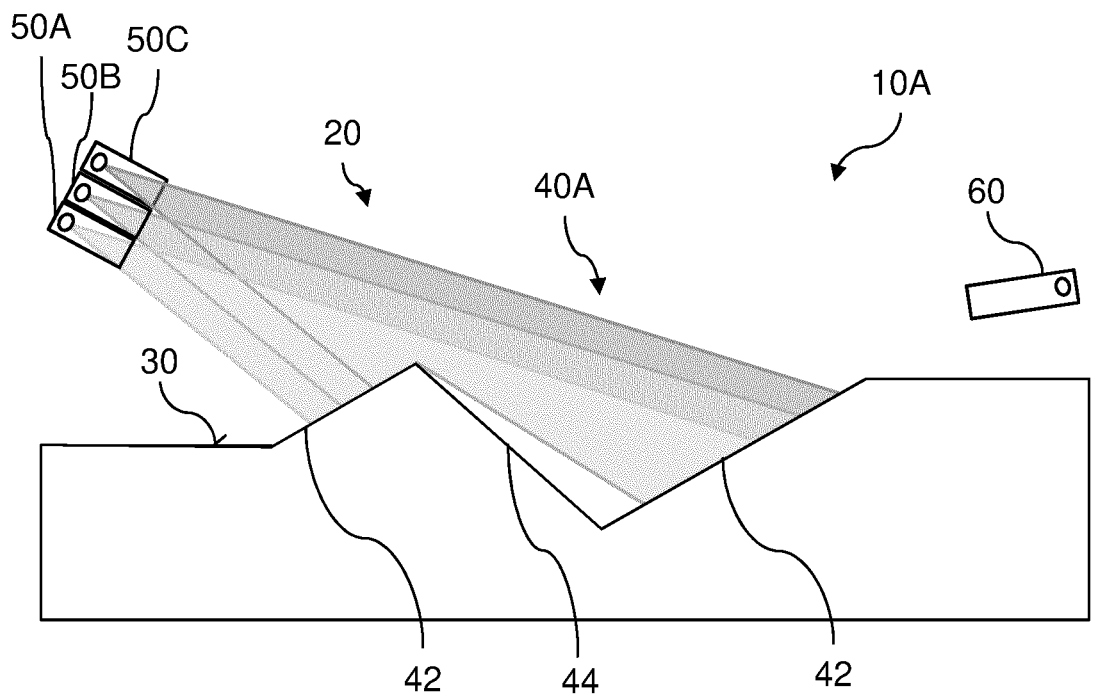
FIGS. 3 and 4 show other exemplary vehicle components in a sectional view.
Figure 4:
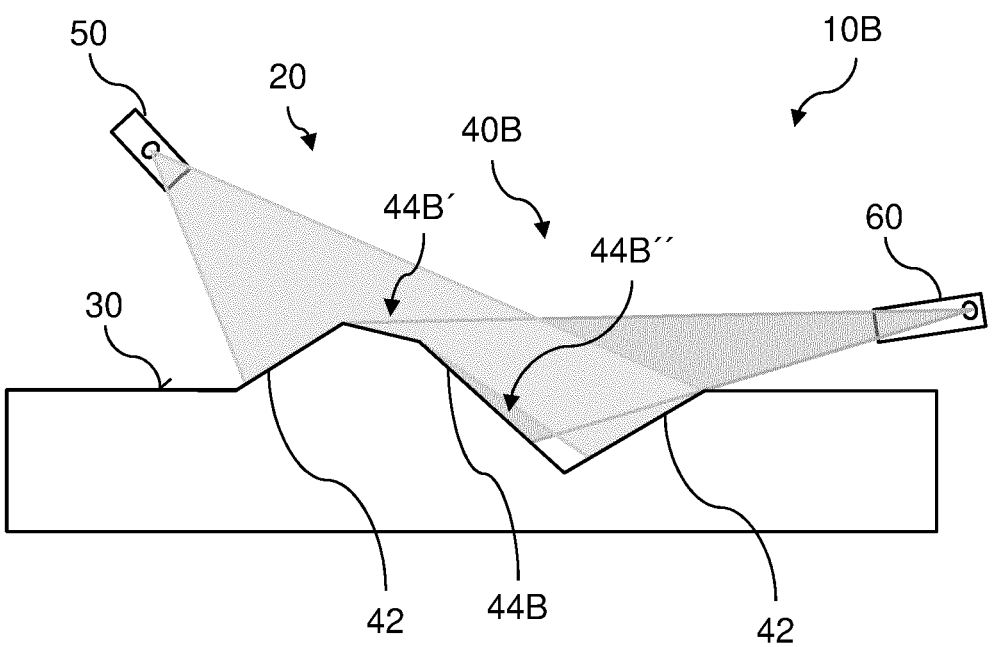

FIGS. 1, 3 and 4 show exemplary vehicle components 10, 10A and 10B having a visible side 20, on which a component surface 30 comprising a three-dimensional structural pattern 40, 40A, 40B is arranged. In FIGS. 1, 3 and 4, for reasons of illustration, only one individual structure of the structural pattern 40, 40A, 40B is represented. The structural pattern 40, 40A, 40B comprises a plurality of these individual structures, which may be arranged next to one another and behind one another.

Figure 5:
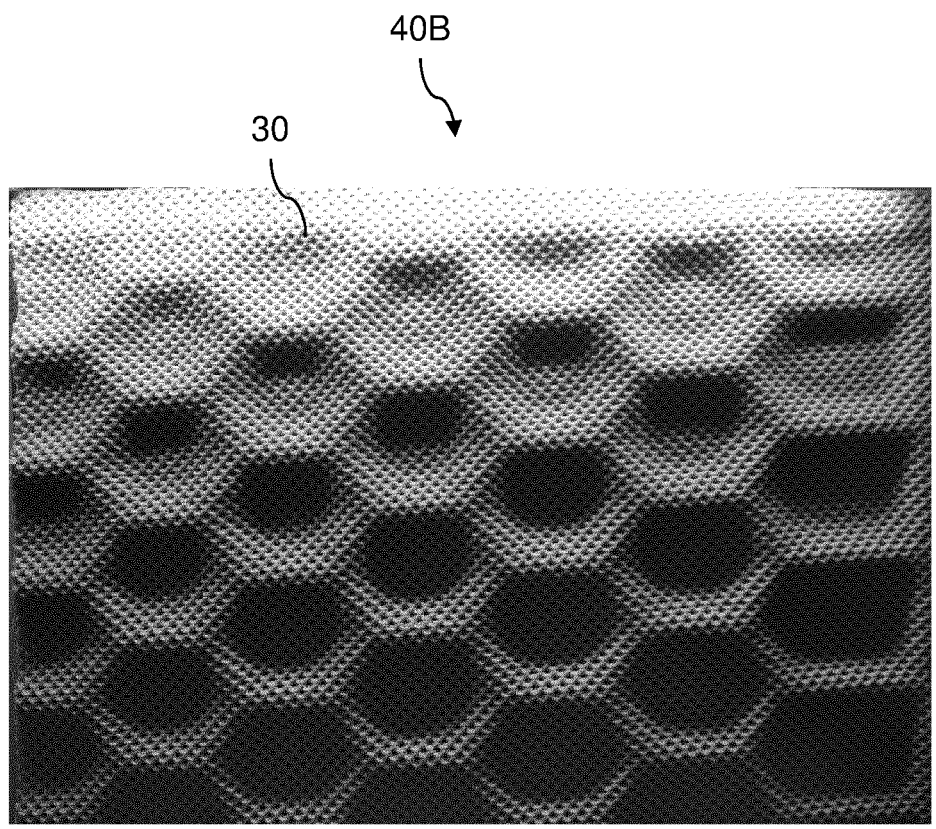
FIG. 5 shows a plan view of an exemplary three-dimensional structural pattern.

The structural pattern 40, 40A, 40B may be a periodic or tapering structural pattern. An exemplary periodic structural pattern 40C, which is formed by a plurality of individual structures, is shown in FIG. 5. The component surface 30 depicted there is a textile surface, although the component surface may alternatively also be formed as a leather surface, wood surface, metal surface or plastic surface.

The vehicle component 1 furthermore comprises a first light generating device 50 and a second light generating device 60. The first light generating device 50 is arranged in such a way that its light cone 52 strikes first structural sections 42 of the structural pattern 40. Second structural sections 44 remain unilluminated, the first lighting device 50 generating shadowing there. The second light generating device 60 is arranged in such a way that its light cone 62 strikes second structural sections 44 of the structural pattern 40 and generates shadowing on the first structural sections 42. Different structural sections may thus be illuminated with different light intensities or colors, and attractive and novel light/shadow effects may be generated.

Figure 2:
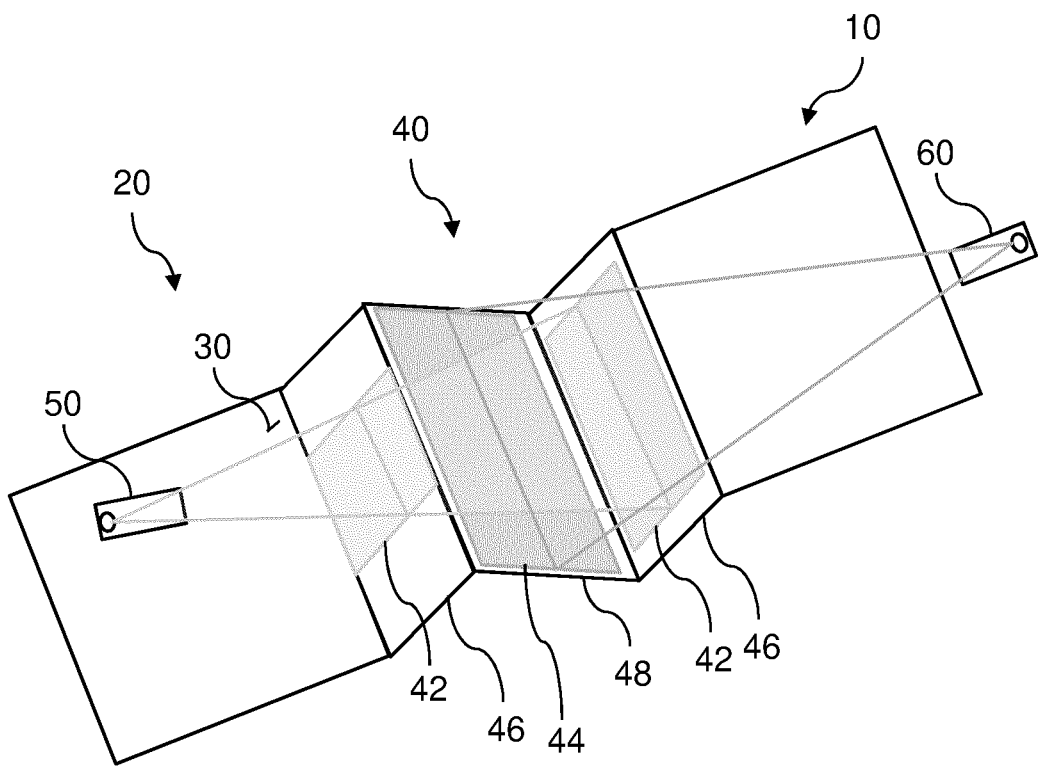
FIG. 2 shows a plan view of the vehicle component of FIG. 1.

FIG. 2 shows a plan view of the vehicle component of FIG. 1 in order to illustrate the structural sections 42 and 44 that receive light.

The structural pattern 40 of FIGS. 1 and 2 is a sawtooth structural pattern having first and second structural faces 46, 48. In order to generate the light/shadow effect described above, in this configuration a principal angle of incidence α1 of the light emitted by the first light generating device 50 is greater than the second pitch angle β2 of the second structural face 48, and a principal angle of incidence α2 of the light emitted by the second light generating device 60 is greater than a first pitch angle β1 of the first structural face 46.

FIG. 3 shows another exemplary vehicle component 1A having three first light generating devices 50A, 50B and 50C, which illuminate the vehicle component with an offset, so that they illuminate different structural sections but neighboring light cones intersect. The light generating devices 50A, 50B and 50C respectively radiate light with a different light color. By the superposition of the light cones, mixed colors may be produced and additional color effects may be generated on the component. By way of example, a second light generating device 60 for generating the light/shadow effect described above is represented. Alternatively, two or more second light generating devices may also be provided—in a similar way to the first light generating devices.

FIG. 4 shows another alternative exemplary embodiment, in which the second structural section 44B comprises a kinked profile that has a shallower pitch angle in the upper region 44B' than in the lower region 44B". The first light generating device 50 is arranged in such a way that light emitted by it generates shadowing in the lower subregion 44B" of the second structural section 44B, but illuminates an upper subregion 44B' of the first structural section. With the superimposed illumination by the second light generating device 60, two different brightness or color effects are obtained on the second structural section 44B.

The arrangement comprising a plurality of light generating devices may also be combined with the exemplary embodiment of FIG. 3.

LIST OF REFERENCES 10, 10A, 10B vehicle component
20 visible side
30 component surface
40, 40A, 40B, 40C structural pattern
42, 44 structural sections
46, 48 structural face
50, 50A-C, 60 light generating device
52, 62 light cone

The invention claimed is:

1. An illuminable vehicle component, comprising:
   a visible side and a component surface arranged on the visible side, wherein the component surface is provided with a three-dimensional structural pattern,
   a first light generating device, which is arranged in a defined position with respect to the component surface such that light emitted by the first light generating device illuminates first structural sections and generates shadowing on second structural sections, and
   a second light generating device, which is arranged in a defined position with respect to the component surface such that light emitted by the second light generating device illuminates the second structural sections and generates shadowing on the first structural sections, wherein:
   two or more first light generating devices are provided, which are respectively configured to illuminate different first structural sections, and
   light cones of the two or more first light generating devices partially overlap one another.

2. The illuminable vehicle component according to claim 1, wherein:
   the light emitted by the first light generating device and the light emitted by the second light generating device are directed onto mutually opposite sides of the component surface.

3. The illuminable vehicle component according to claim 1, wherein:
   the first light generating device is arranged such that the light emitted by the first light generating device generates shadowing in a lower subregion of the second structural sections and illuminates an upper subregion of the second structural sections.

4. The illuminable vehicle component according to claim 1, wherein:
   the three-dimensional structural pattern comprises a serrated structure with first structural faces having a first pitch angle and second structural faces having a second pitch angle,
   a principal angle of incidence of the light emitted by the first light generating device is greater than the second pitch angle, and a principal angle of incidence of the light emitted by the second light generating device is greater than the first pitch angle.

5. The illuminable vehicle component according to claim 1, wherein:
the two or more first light generating devices are configured to emit different light colors with respect to one another.

6. The vehicle component according to claim 1, wherein:
the three-dimensional structural pattern is a periodic structure.

7. The vehicle component according to claim 1, wherein:
the three-dimensional structural pattern comprises a tapering structural pattern.

8. The vehicle component according to claim 1, wherein:
a maximum height of the three-dimensional structural pattern is 2 cm or less.

9. The vehicle component according to claim 1, wherein:
a maximum height of the three-dimensional structural pattern is 1 cm or less.

10. The vehicle component according to claim 1, wherein:
the component surface is configured as a textile surface, leather surface, wood surface, metal surface or plastic surface.

11. A motor vehicle comprising the vehicle component according to claim 1, wherein:
the vehicle component forms an inner trim component or an interior surface of the vehicle.

12. The motor vehicle according to claim 11, wherein:
the first light generating device and the second light generating device are arranged in a fixed position in the vehicle.

* * * * *